INVENTORS
Paul V. Titus.
Robert M. Crone.
BY
*William R. Lane*
ATTORNEY

INVENTORS
Paul V. Titus.
Robert M. Crone.
ATTORNEY

United States Patent Office 2,924,399
Patented Feb. 9, 1960

2,924,399

AIRCRAFT FLAP STRUCTURE

Paul V. Titus and Robert M. Crone, Columbus, Ohio, assignors to North American Aviation, Inc.

Application April 23, 1956, Serial No. 579,989

2 Claims. (Cl. 244—42)

The present invention relates broadly to aircraft control surfaces, and is more particularly concerned with a novel wing flap arrangement especially well adapted for high speed military aircraft.

It is well-known in the art that an effective means to increase wing lift and therefore decrease the aircraft stall speed is the slotted flap arrangement wherein the flap is carried with a substantial portion of its leading edge contour spaced rearwardly of fixed wing structure to provide when the flap is extended a slot or opening therebetween through which air may flow upwardly and rearwardly along the upper flap surface substantially parallel to the contour thereof. And while the provision of slotted flap constructions in the relatively thick wing structures employed in the past has not created serious problems by way of space and weight, the increasing use of wings with a greater degree of sweep back and a substantially reduced thickness has rendered it relatively impossible to employ the conventional slotted flap construction on modern military aircraft without encountering design penalties.

To explain, the customary manner of extending the flap to open the slot between said flap and fixed wing structure is by means of tracks or extendable linkages which impart translatory movement to the flap. However, such devices cannot readily or efficiently be applied to high performance military aircraft without encountering serious problems of increased weight existing in the tracks or linkages themselves, and increased drag in the event the ends of the flap tracks were required to protrude beyond the wing mold line. However, notwithstanding the weight and drag penalties noted, the available space within the contours of extremely thin or razor wings encountered recently effectively precludes the use of the slotted flap constructions well-known in the prior art.

It is therefore an important aim of the present invention to provide a new and improved slotted flap construction which substantially avoids the objections and limitations of earlier arrangements and yet provides a marked improvement in wing lift effectiveness.

Another object of the invention is to provide a novel slotted flap arrangement characterized by its relatively light weight, small space requirements and simple mode of operation, said mode being accomplished without resort to the translatory motion which has been common with prior art devices.

Another object of this invention lies in the provision of a high lift producing flap construction which includes means in association with a hingedly carried flap for effectively directing air along a confined path through the slot when said flap is in an extended position, and means associated with fixed wing structure for thereafter directing said air along the upper flap surface substantially parallel to the contours thereof.

A further object of the invention is to provide a minimum drag wing configuration including a single slotted flap pivotally mounted on fixed wing structure, said configuration also including an extendable door normally closing the slot and forming a substantially unbroken smooth line contour with the wing structure and flap when in a closed position, said deflector member being pivotally carried by the flap and movable therewith to open the slot and positively direct air along a confined path therethrough.

Other objects and advantages will become more apparent during the course of the following description, particularly when taken in connection with the accompanying drawings.

In the drawings, wherein like numerals are employed to designate like parts throughout the same:

Figure 1:
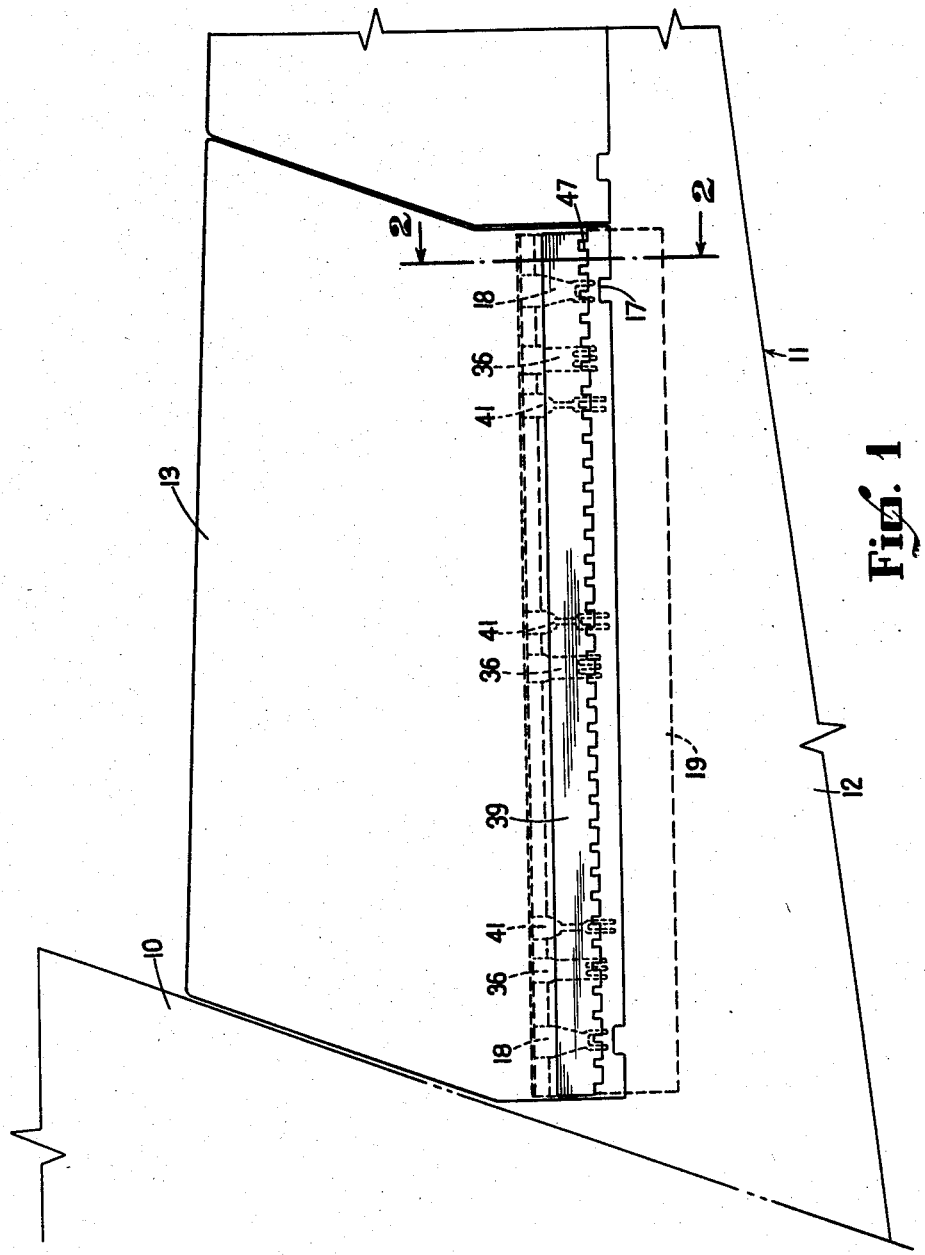
Fig. 1 is a typical plan view of applicants' novel flap construction, and showing by broken lines the various fixed linkages and members for directing air into and through the slot.

With reference now to the drawings, and more particularly to Fig. 1 thereof, there is indicated by the numeral 10 an aircraft fuselage which supports a wing 11, said wing comprising a fixed portion 12 to which is movably attached a flap 13. In the wing construction shown the flap is installed along the inboard wing panel; however, it may at times be preferred to locate the flap on the center wing panel, or on both panels. Further, as will also be appreciated, the wing may be constructed to include such devices as ailerons, spoiler-deflectors, leading edge slats, and the like.

Figure 2:
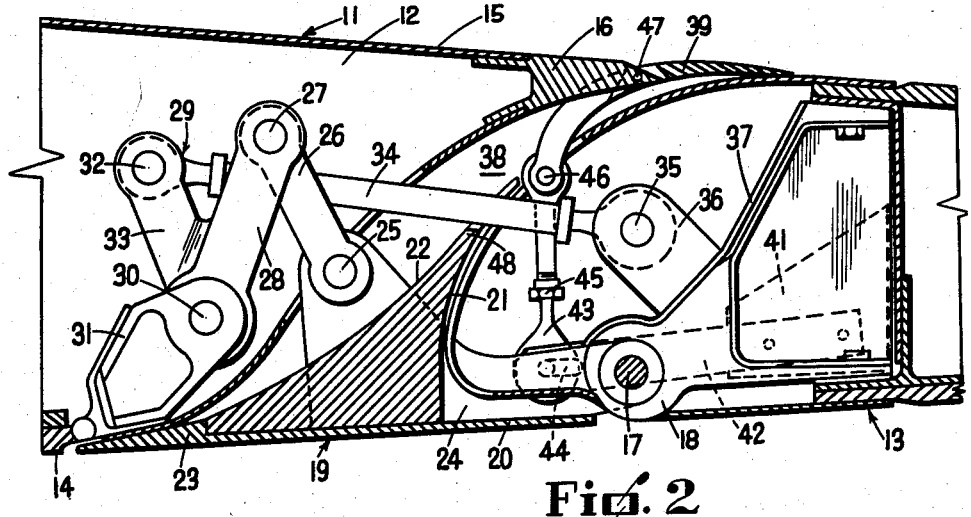
Fig. 2 is a cross-sectional view of the present slotted flap arrangement, taken substantially along the line 2—2 of Fig. 1.

The wing 11 may be of conventional multiple spar construction, and as appears in Fig. 2, preferably is formed along the trailing edge of its fixed portion 12 to present a smoothly curved contour which moves upwardly from the wing lower mold line 14 and slightly concavely as it forms with the wing upper mold line 15 a relatively sharp trailing edge extension 16. It may be noted that said extension is disposed rearwardly of the leading edge of the flap when said flap is in either of the positions of Fig. 2 or 3, the extension 16 thereby assisting in directing air over the flap in the manner later to be described.

The present flap 13 is adapted to pivot upwardly and downwardly about a single hinge line, designated by the numeral 17, and the means effective to accomplish this end may comprise a bifurcated flap hinge bracket 18 suitably affixed to flap structure and rotatable about the point 17 through hinged connection with a suitable flap supporting member (not shown) attached to the spars of the wing fixed portion 12. Means of any desired type may be employed to impart rotative movement to the flap, and this may comprise a torque tube and screw jack means associated therewith actuated by electrical and/or mechanical means controllable by the pilot.

Carried upon the same hinge line 17 which supports the flap is a slot door 19 extending spanwise of the flap and presenting in cross-section a generally triangular shape. As shown, the door is provided with a generally flat base portion 20 supporting a concavely curved and vertically extending rear wall 21 associated with an essentially similarly curved upper surface 22 which converges with the base portion 20 to form a relatively sharp forward extension 23 arranged to make matching contact with the rearward portion of the wing lower mold line 14.

Support for the slot door 19 upon the pivot point 17 common with the flap 13 is provided by a plurality of brackets 24 which preferably are bifurcated at one end. Movably carried adjacent the upper end of each of said brackets by pins or the like 25 is a link member 26, said member in turn being hingedly associated by additional pin means 27 with one arm 28 of a bell crank assembly 29. The bell crank is constructed to pivot forwardly and rearwardly about the point 30, and accordingly is suitably joined at said point to a bracket member 31 rigidly carried by the fixed wing portion 12.

Associated at 32 with the other arm 33 of the bell crank assembly 29, and arranged to move forwardly and rearwardly therewith, is a longitudinally adjustable connecting member 34, said member being hingedly joined at its opposite end by a suitable pin connection 35 to an arm 36 of a bracket assembly 37 attached to fixed structure of the pivotally carried flap 13. The bracket 37 may be arranged in any desired manner to move in unison with the flap, and this may be accomplished by affixing the bracket 37 to the flap hinge bracket 18, by the provision of a generally V-shaped bracket having one of the legs thereof pivotally carried along the flap hinge line 17, or by any other means adapted to the purpose.

While the operation of the slot door 19 during extension and retraction of the flap 13 will be described in detail hereinafter, it may be noted that the door 19 is carried upon the same hinge line or pivot point 17 as the flap, and that by this arrangement and the fixed linkages above disclosed, the slot door 19 functions when extended or in its downward position of Fig. 3 to open the generally S-shaped slot 38 between the fixed portion 12 of the wing 11 and the substantially convexly shaped leading edge of the flap 13. In addition, by so arranging the door and constructing it in substantially the configuration described, said door when extended into the airstream is particularly effective in scooping air from beneath the wing and directing said air along a predetermined sinuous path into and substantially through the major portion of the slot 38. It may thus be seen that an increased quantity of air flow is obtained by means of the ram action thereby induced.

Means are additionally provided to impart final direction to the air as it passes unidirectionally through the remainder of the open slot 38 and rearwardly along the upper contour of the flap 13. Such means are also effective to close the slot when the flap is in the retracted position of Fig. 2, and one means particularly suitable for this purpose is a curved shroud or deflector 39 located on the trailing edge extension 16 of the wing fixed portion 12 and extending spanwise thereof. The deflector is constructed to provide during the "flaps down" position of Fig. 3 an overhang on the wing trailing edge extension 16 to thereby form with the leading edge or nose 40 of the flap an opening adjacent the exit end of the slot 38 of substantially uniform depth, as well as a smooth curvilinear path for the air as it moves outwardly from the slot. Thus, by substantially the shroud configuration shown, the outwardly moving air is not permitted to lose its effectiveness as a lift inducing medium by rushing upwardly away from the flap leading edge contour, but instead, is forcibly directed along the upper contour of the flap until it mixes with other available air and is carried rearwardly therewith along said upper flap contour. In addition, by pivoting the shroud on fixed wing structure rather than on the flap, there is provided a more effective slot closure device as the flap moves from the extended to retracted position.

It may be noted from Fig. 2 that the shroud 39 forms with the wing fixed portion 12 and flap 13 a substantially smooth unbroken contour when said flap is in the closed or retracted position shown. And while upon occasion, in order to derive the benefits obtained by curving the shroud in the manner shown, said shroud may rise slightly above the flap in its closed position, experience has demonstrated that no harmful airflow effects result. However, should it be found desirable for aerodynamic reasons that a precisely smooth line contour be provided, one effective means is to construct a spring-loaded trap door in the flap upper surface to receive the trailing edge portion of the shroud during the "flaps up" position of Fig. 2.

Provision is made for upwardly and downwardly pivotal movement of the shroud 39 substantially simultaneously with retraction and extension of the flap 13. One preferred means which has proven suitable in practice comprises a bracket member 41 rigidly supported upon flap structure and provided with a bifurcated end portion 42 which receives one end of a connecting member 43 and is swingably joined thereto by a pin device or the like 44. The member 43 is constructed for longitudinal adjustment effected by threadable action thereon of the nut 45, while the opposite end of said connecting member is hingedly joined at 46 to the leading end of the shroud 39 at a plurality of locations along the span thereof. And as best appears in Figs. 2 and 3, the shroud or deflector is pivotally carried substantially midway of its width upon the trailing edge extension 16 of the fixed wing portion 12 by any desired pin or hinge connection 47 whereby said shroud may readily be caused to swing upwardly or downwardly about the point 47 substantially simultaneously with similar movements by the flap 13. And while it may upon occasion be found that a stationary shroud upon the fixed wing will be effective to properly direct airflow rearwardly upon the flap, experience to date has indicated that a more accurate match of the wing upper surface contours is accomplished by a pivotal arrangement of the character herein disclosed.

Operation of applicants' new and improved slotted flap construction is substantially as follows. Upon actuation of the flap 13 when in the closed or retracted position of Fig. 2, which actuation may be caused by the application of electrical and/or mechanical energy to suitable torque tube and screw jack means connected to flap structure, the flap will rotate clockwise about the hinge point or line 17. Substantially simultaneously therewith the bracket assembly 37 associated with the slot door 19 will rotate counterclockwise and rearwardly, causing the connecting member 34 to linearly move backwardly and thereby rock the bell crank assembly 29 rotatably rearwardly about its connection 30 with the bracket 31 carried by fixed wing structure 12. As said bell crank rotates, the link member 26 connected thereto will push downwardly upon the slot door brackets 24 supporting the door 19, and will effectively cause said door to pivot in a downward direction counterclockwise about the hinge line 17 to open said door to the position of Fig. 3 whereby air is directed from adjacent the lower wing surface by action of the door forward extension 23, and caused to pass upwardly into the slot 38 by means of the door upper surface 22.

Figure 3:
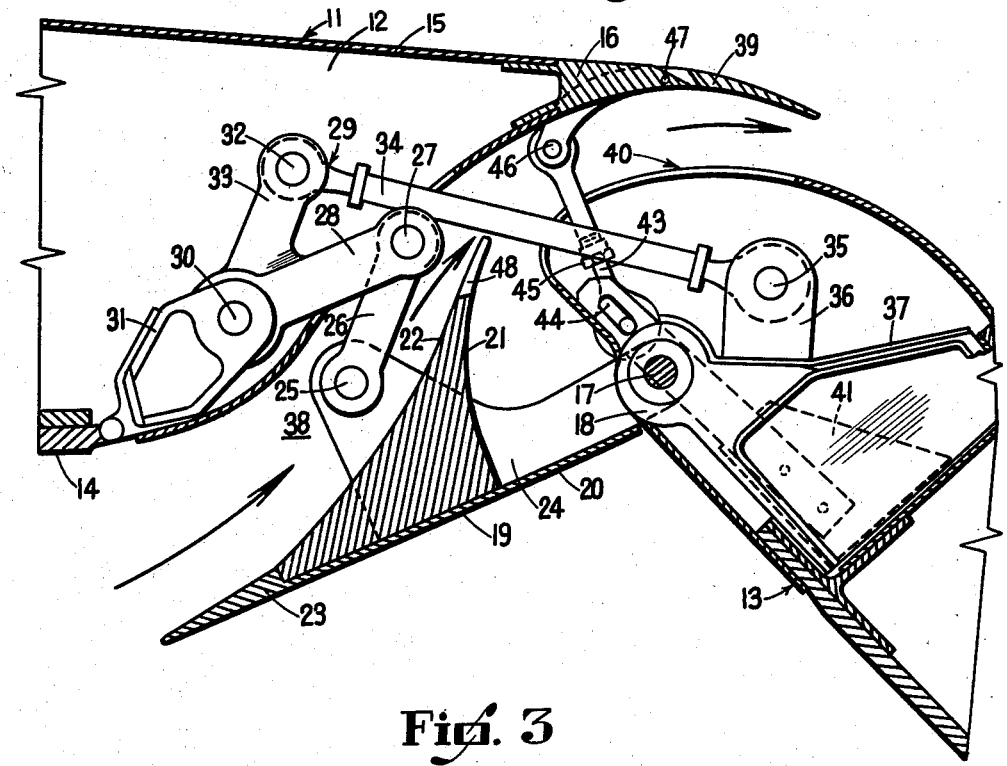
Fig. 3 is a view similar to Fig. 2, but showing the components of the flap arrangement when the flap is in its extended position.

Also essentially simultaneously with the foregoing described movement of the flap 13 and slot door 19, the deflector or shroud 39 will be caused to move from a slot closing position as shown in Fig. 2 to the position of Fig. 3 whereby it functions to impart final controlled direction to the air passing through the trailing portion of the slot 38. Thus, as the flap 13 rotates rearwardly it carries therewith the bracket member 41, and by reason of the swingable connection between the bifurcated end 42 of said bracket 41 and the arm 43, said arm will push generally upwardly on the inboard end of the shroud and will cause said shroud to rotate about the point 47 in a generally clockwise direction to move the trailing portion thereof into a position generally parallel to the curved contour of the leading edge area or frontal portion 40 of the flap 13. A smooth confined path through the slot 38 is thereby provided, extending from outwardly and forwardly of the entrance to the slot, that is, from the relatively sharp forward extension 23 of the slot door 19 to a point rearwardly of the trailing edge of the shroud. Further, by the provision particularly of a rearwardly tapering and relatively sharp portion 48 on the slot door 19 at which the rear wall 21 and upper surface 22 merge, the air directed through the slot 38 is not permitted to leak downwardly between said rear wall and the flap nose 40, and when the door is in its closed position, air which might leak into the slot is to a degree prevented by said portion 48 from passing over the retracted flap.

It may thus be seen from the foregoing that there is herein provided a novel slotted flap construction characterized by its simplicity of operation, and relatively small space and weight requirements. In fact, applicants have found that the disclosed arangement permits a weight savings of 100 pounds over a track type flap design of substantially the same size, thereby reducing the cost and increasing the performance of the airplane. Further, it is to be noted that each of the components move about fixed pivots, and that there is no translatory motion of either the flap, slot door, or shroud. And as has been pointed out, by the provision of applicants' novel slot door and deflector in combination with the slotted flap, a greater amount of air is caused to pass through the slot and over the flap, producing substantially increased wing lift effectiveness and decreased stall speed.

It may thus be seen from the foregoing that there is herein shown and described is to be taken as a preferred embodiment of the same, and that various changes in the shape, size and arrangement of parts may be resorted to without departing from the spirit of the invention and the scope of the subjoined claims.

We claim:

1. In an aircraft wing having a flap member and having a slot for conducting air scooped from the underside of the wing by projecting door means to the upperside of the wing when the flap member is moved to an extended position, in combination: a wing fixed portion located forward of the slot and the flap member, a trailing edge extension attached to said fixed portion at the upperside trailing edge thereof, plate-like shroud means extending rearwardly from said trailing edge extension and having a rigid inboard end component which projects into the slot, pivot means connecting said plate-like shroud means to said trailing edge extension, and a link pivotally connected at one extreme to said shroud means inboard end component and pivotally connected at an opposed extreme to said flap member, said link rotating said shroud means about said trailing edge extension to deflect air passing through said slot toward a surface of said flap member when said flap member is rotated to an extended position.

2. An aircraft wing comprising: a fixed portion having a trailing edge located at the upperside thereof, a rotatable flap portion supported by said fixed portion and having a leading edge spaced from said fixed portion to establish a slot which conducts air through the wing, door means projecting from the underside of the wing when said flap portion is extended to thereby scoop air into said slot, plate-like shroud means faired to, carried by, and rotatable about said fixed portion trailing edge to provide a faired continuation of said slot and to deflect air moving through said slot toward the upper surface of said flap portion, and a link pivotally connected at one extreme to said shroud means and pivotally connected at an opposite extreme to said flap portion, said link causing said shroud means to rotate about said fixed portion trailing edge to efficiently deflect air scooped by said door means over said flap portion when said flap portion is rotated to an extended position.

References Cited in the file of this patent

UNITED STATES PATENTS

| | | |
|---|---|---|
| 2,276,522 | Staufer | Mar. 17, 1942 |
| 2,334,975 | Williams | Nov. 23, 1943 |
| 2,542,792 | Bennett | Feb. 20, 1951 |

FOREIGN PATENTS

| | | |
|---|---|---|
| 846,337 | France | June 5, 1939 |